United States Patent
De'Longhi et al.

(10) Patent No.: US 9,795,249 B2
(45) Date of Patent: Oct. 24, 2017

(54) AUTOMATIC COFFEE MACHINE WITH A WATER AND/OR STEAM DISPENSER

(71) Applicant: De'Longhi Appliances S.R.L., Treviso (IT)

(72) Inventors: Giuseppe De'Longhi, Treviso (IT); Andrea Aibionti, Pease (IT); Edy Altoe', S. Lucia di Piave (IT)

(73) Assignee: De'Longhi Appliances S.R.L., Treviso (IT)

( * ) Notice: Subject to any disclaimer, the term of this patent is extended or adjusted under 35 U.S.C. 154(b) by 101 days.

(21) Appl. No.: 14/768,630

(22) PCT Filed: Feb. 10, 2014

(86) PCT No.: PCT/EP2014/052512
§ 371 (c)(1),
(2) Date: Aug. 18, 2015

(87) PCT Pub. No.: WO2014/131603
PCT Pub. Date: Sep. 4, 2014

(65) Prior Publication Data
US 2016/0000260 A1    Jan. 7, 2016

(30) Foreign Application Priority Data
Feb. 27, 2013 (IT) .............................. MI2013A0285

(51) Int. Cl.
*A47J 31/46* (2006.01)
*A47J 31/44* (2006.01)

(52) U.S. Cl.
CPC ........... *A47J 31/46* (2013.01); *A47J 31/4482* (2013.01); *A47J 31/4489* (2013.01)

(58) Field of Classification Search
CPC ..... A47J 31/46; A47J 31/4489; A47J 31/4482
(Continued)

(56) References Cited

U.S. PATENT DOCUMENTS 4,800,805 A * 1/1989 Mahlich .............. A47J 31/4489
261/121.1
5,769,135 A * 6/1998 Mahlich .............. A47J 31/4489
141/70
(Continued)

FOREIGN PATENT DOCUMENTS

DE    202004020909    4/2006
DE    202008008257    10/2009
(Continued)

OTHER PUBLICATIONS

International Search Report dated Jun. 4, 2014 for International Application No. PCT/EP2014/052512: International Filing Date: Feb. 10, 2014; 4 pages.
(Continued)

*Primary Examiner* — Thien S Tran
(74) *Attorney, Agent, or Firm* — Blank Rome LLP

(57) ABSTRACT

An automatic coffee machine including a hydraulic circuit having a fixed terminal piece, for supplying water and/or steam, accessible from a front wall of the machine at a distance above a resting surface of the machine. Also included is a dispenser extending frontally of the front wall, comprising a hollow body having a first longitudinal portion, and a second longitudinal portion rigidly connected to the first longitudinal portion and developing along a second longitudinal axis transverse to a first longitudinal axis of the first longitudinal portion. The first longitudinal portion has a first longitudinal end conformed for a rigid, removable hydraulic and mechanical connection with the fixed terminal piece and a second longitudinal end distal from the front wall, wherefrom the second longitudinal portion extends. The second longitudinal portion slidingly supports along the axis thereof an extension for regulating a dispensing distance from the resting surface.

14 Claims, 4 Drawing Sheets

(58) Field of Classification Search
USPC .... 99/279, 290, 293, 294, 295, 323.1, 323.3
See application file for complete search history.

(56) References Cited

U.S. PATENT DOCUMENTS

| | | | |
|---|---|---|---|
| 5,931,080 A * | 8/1999 | Roure Boada | A47J 31/4482 261/DIG. 76 |
| 2007/0193450 A1* | 8/2007 | Magg | A47J 31/4482 99/279 |
| 2014/0123858 A1* | 5/2014 | Rellis | A47J 31/46 99/293 |

FOREIGN PATENT DOCUMENTS

| | | |
|---|---|---|
| EP | 2305081 | 4/2011 |
| WO | 2005072583 | 8/2005 |
| WO | 2010106272 | 9/2010 |

OTHER PUBLICATIONS

Written Opinion dated Jun. 4, 2014 for International Application No. PCT/EP2014/052512; International Filing Date: Feb. 10, 2014; 5 pages.
English translation; German Application No. DE202008008257; 8 pages.
English translation; German Application No. DE202004020909; 7 pages.
English translation; International Publication No. WO2005/072583: 9 pages.
English translation; International Publication No. WO2010/106272; 8 pages.
English translation; European Application No. EP2305081; 21 pages.

* cited by examiner

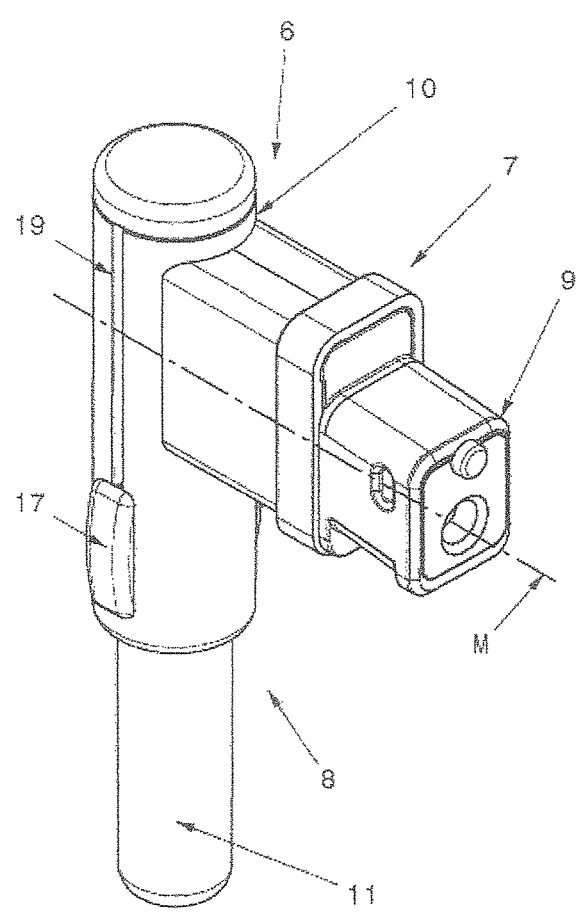
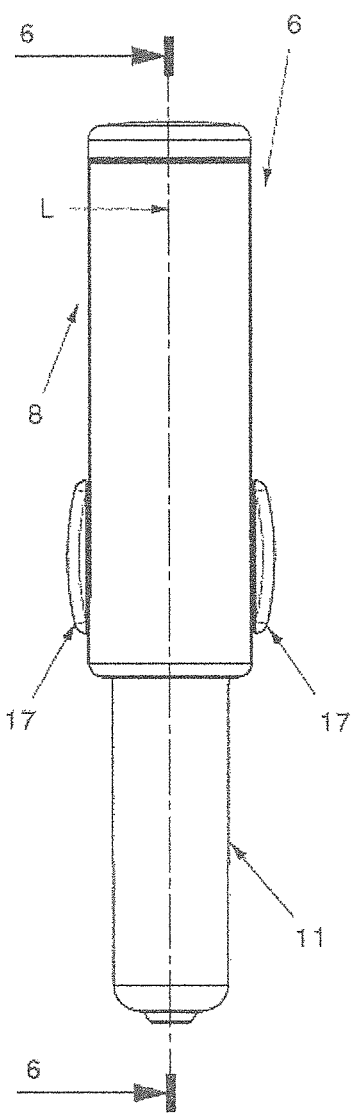
Fig. 4
Fig. 5

US 9,795,249 B2

AUTOMATIC COFFEE MACHINE WITH A WATER AND/OR STEAM DISPENSER

RELATED APPLICATIONS

This application is a U.S. national phase application of International Application No. PCT/EP2014/052512, filed Feb. 10, 2014; which application claims priority to Italy Application No. MI2013 A000285, filed Feb. 27, 2013. Each of the above-identified related applications are incorporated by reference.

FIELD OF USE

The present invention refers to an automatic coffee machine of a type having, at the front, a water and/or steam dispenser positioned at a distance above the resting surface for the cups.

BACKGROUND OF THE INVENTION

In the current state of the art, there are fixed dispensers that have the drawback of not being adaptable to the heights of various cups that may be positioned on the respective resting surface, with the result that dispensing can involve undesirable spillage of hot water and/or escaping steam, which, in turn, can cause painful burns.

A dispenser having a body that can be adjusted in position to adapt to various heights of cups has been proposed to overcome this drawback.

This dispenser has a zone for attachment to the machine that is movable inside the body of the machine and that is connected to an internal hydraulic circuit of the machine by means of a flexible tube.

One drawback of this adjustable dispenser consists in the need to provide for additional space inside the body of the machine so as to allow for movement of the attachment zone.

SUMMARY OF THE INVENTION

A further drawback of this adjustable dispenser consists in the risk of damaging the flexible tube, which is moved each time the dispenser is adjusted.

Therefore, the technical task of the present invention is to realise an automatic coffee machine that makes it possible to eliminate the technical drawbacks of the prior art described hereinabove.

Within the scope of this technical task, one aim of the invention is to realise a coffee machine that has a water and/or steam dispenser that can be adjusted in height, without requiring increased dimensions of the machine.

Another aim of the invention is to realise a coffee machine that has a height-adjustable water and/or steam dispenser that markedly reduces exposure of the dispenser to the risk of being damaged.

Yet another aim of the invention is to realise a coffee machine that has a simple and convenient system for adjusting the height of the water and/or steam dispenser. The technical task, as well as these and other aims, according to the present invention, are achieved by realising an automatic coffee machine comprising a hydraulic circuit having a fixed terminal piece for supplying water and/or steam and that is accessible from the front wall of the machine at a distance above the resting surface of the machine, and a dispenser that extends frontally to said front wall, characterised in that said dispenser comprises a hollow body having a first longitudinal portion and a second longitudinal portion that is rigidly connected to the first portion and developing along an axis transverse to that of said first longitudinal portion, said first portion having a first longitudinal end conformed for a rigid, removable hydraulic and mechanical connection with said terminal piece and a second longitudinal end distal from said front wall wherefrom said second portion extends, said second longitudinal portion slidingly supporting along the axis thereof an extension for regulating the dispensing distance from the said resting surface.

Moreover, additional characteristics of the present invention are defined in the claims herein below.

BRIEF DESCRIPTION OF THE DRAWINGS

Further characteristics and advantages of the invention will become more apparent from the description of a preferred, but not exclusive, embodiment of the automatic coffee machine according to the invention, which is illustrated by way of approximate, non-limiting example in the accompanying drawings, in which:

FIG. 4 shows a perspective view of the dispenser with the extension in a protracted position;

FIG. 5 shows a front view of the dispenser in the configuration appearing in FIG. 4;

Figure 1:
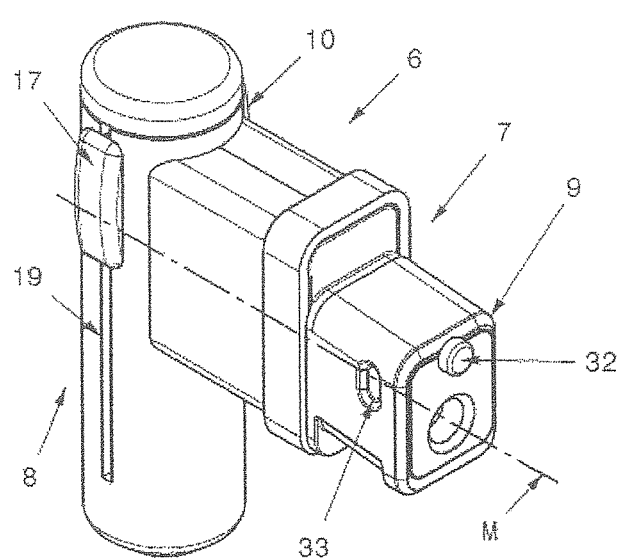
FIG. 1 shows a perspective view of the dispenser with the extension in a retracted position.
Figure 2:
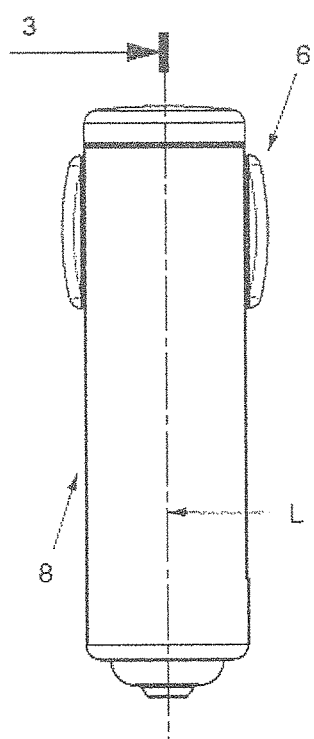
FIG. 2 shows a front view of the dispenser in the configuration appearing in FIG. 1.
Figure 3:
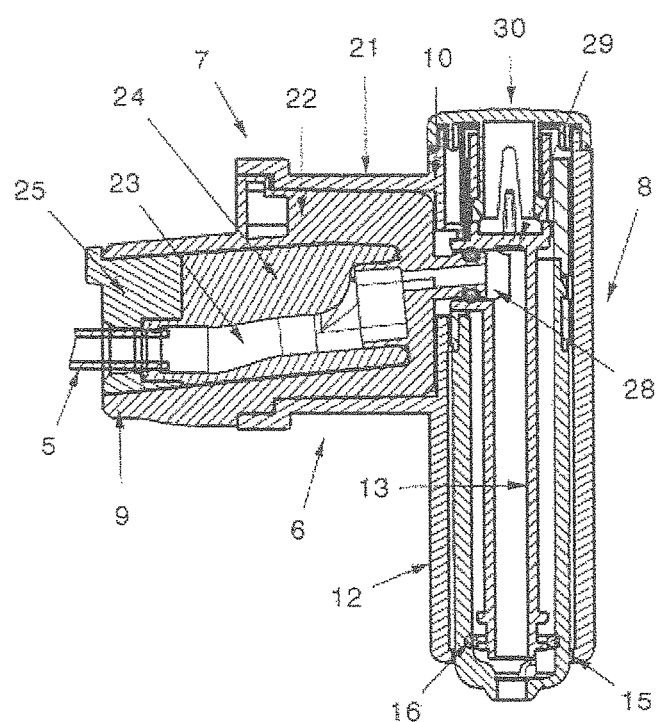
FIG. 3 shows a section of the dispenser taken along line 3-3 of FIG. 2.
Figure 6:
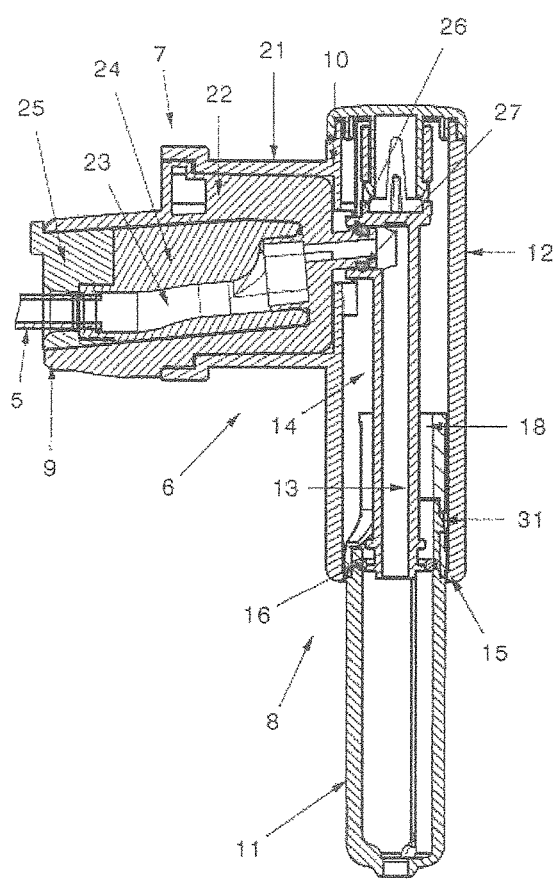
FIG. 6 shows a section of the dispenser taken along line 6-6 of FIG. 5.
Figure 7:
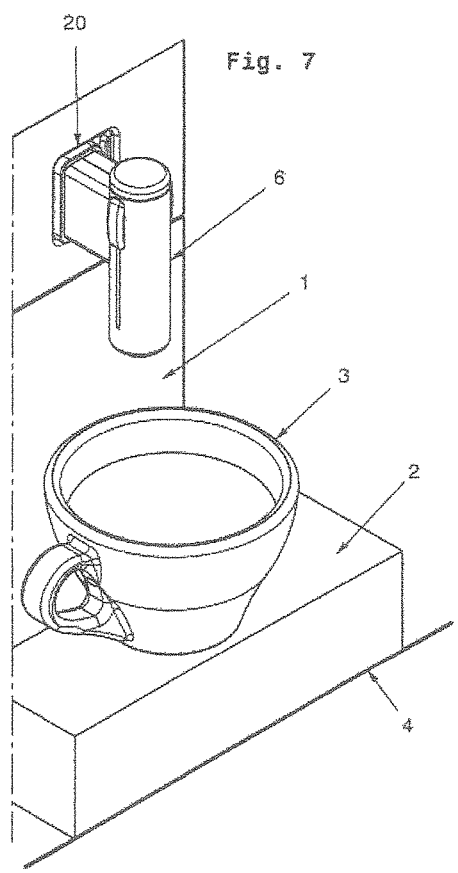
FIG. 7 shows the front wall of the machine with a cup positioned below the dispenser in the configuration with the extension retracted.
Figure 8:
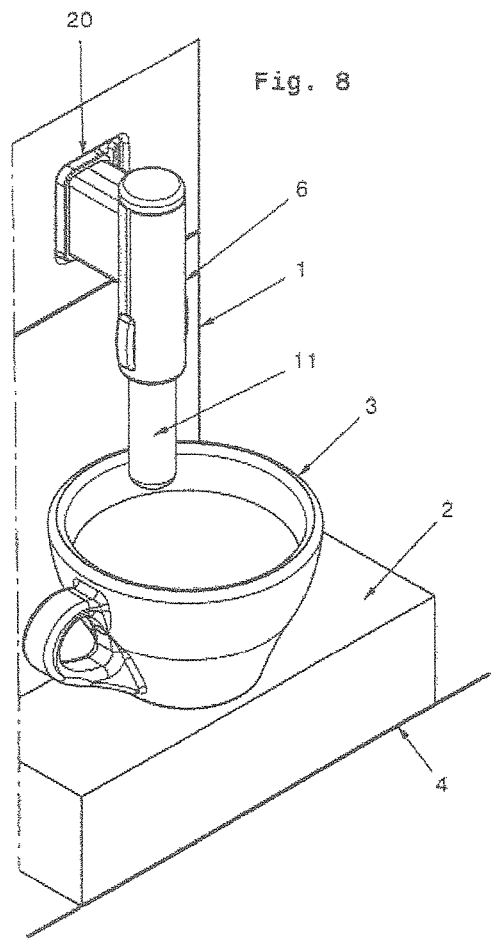
FIG. 8 shows the front wall of the machine with a cup positioned below the dispenser in the configuration with the extension protracted.
Figure 9:
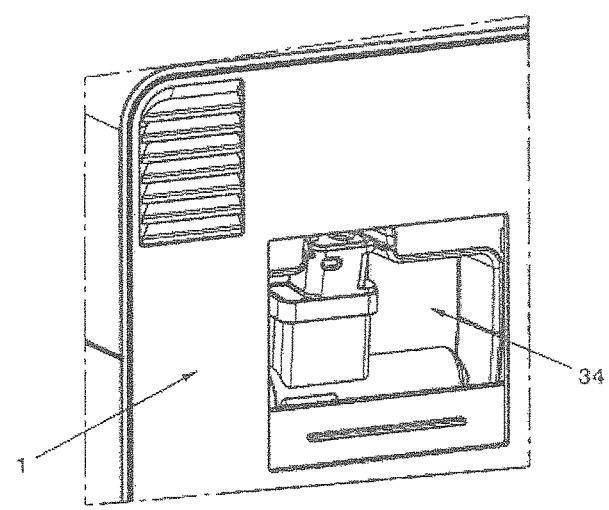
FIG. 9 shows the dispenser set back into a housing afforded by the lateral wall of the machine.

With reference to the cited figures, the only parts shown of an automatic coffee machine are the front wall 1 and the resting surface 2 for the cups 3, which is raised with respect to the resting surface 4 of the coffee machine.

The automatic coffee machine has an internal hydraulic circuit having a fixed terminal piece 5 for supplying water and/or steam and that is accessible from the front wall 1 at a distance above the resting surface 2 of the cups 3.

The coffee machine has a dispenser 6 that extends frontally of said front wall 1.

The dispenser 6 comprises a hollow body having a first longitudinal portion 7 and a second longitudinal portion 8 that is rigidly connected to the first longitudinal portion 7 and developing along an axis L transverse to the axis M of the first longitudinal portion 7.

More specifically, the first portion 7 of the body of the dispenser 6 and the second portion 8 of the body of the dispenser 6 develop along axes that are perpendicular to each other.

However, the perpendicularity of the axes L and M is not required for functioning of the system, and therefore the axes L and M may also not be perpendicular to each other.

The first longitudinal portion 7 of the body of the dispenser 6 has a first longitudinal end 9 conformed for a rigid, removable hydraulic and mechanical connection with the terminal piece 5 and a second longitudinal end 10 distal from the front wall 1 from which the second longitudinal portion 8 of the body of the dispenser 6 extends.

In particular, the first end 10 of the first portion 7 of the body of the dispenser 6 has a shape that can be interlockingly joined to a recess 20 in the front wall 1 in which the terminal piece 5 is positioned.

The second longitudinal portion 8 of the body of the dispenser 6 slidingly supports along the axis L thereof an extension 11 for regulating the dispensing distance from the resting surface 2 of the cups 3.

The second longitudinal portion 8 of the body of the dispenser 6 comprises a first tubular wall 12 and internally thereof a second tubular wall 13 is positioned and hydraulically connected to the first longitudinal portion 7 of the body of the dispenser 6.

The extension 11 has a tubular conformation and is slidable in a gap 14 defined between the first tubular wall 12 and the second tubular wall 13 of the second longitudinal portion 8 of the body of the dispenser 6.

The extension 11 is extractable from the longitudinal end 15 of the second portion 8 of the body of the dispenser 6 facing the resting surface 2 of the cups 3.

At the end that faces the resting surface 2 of the cups 3, the second tubular wall 13 of the second longitudinal portion 8 of the body of the dispenser 6 has an external perimeter gasket 16 for hydraulic sealing with the extension 11.

More precisely, the first tubular wall 12 and the second tubular wall 13 of the second longitudinal portion 8 of the body of the dispenser 6 are coaxial with each other and, in turn, with the extension 11.

The terminal piece 5 and the first portion 7 of the body of the dispenser 6 are coupled along the axis thereof, which is oriented perpendicularly to the front wall 1 of the coffee machine. In this manner, the axis M of the first portion 7 of the body of the dispenser 6 develops horizontally, whereas the axis L of the second portion 8 of the body of the dispenser 6 develops vertically.

The extension 11 is supplied with manual gripping means for the activation thereof.

The manual gripping means for gripping the extension 11 preferably comprises at least a handle 17 positioned externally of the first tubular wall 12 of the second longitudinal portion 8 of the body of the dispenser 6 and connected to the extension 11 by means of a bridge 18 positioned through a groove 19 that extends longitudinally along the first tubular wall 12 from the end distal from the resting surface 2 of the cups 3 to a point distanced from the end proximal to the resting surface 2 of the cups 3.

The bridge 18 is afforded as a piece that is separate from the extension to which it is connected by means of a set of pawl teeth 31.

In the case illustrated herein, two handles 17 are provided in diametrically opposite positions on the first tubular wall 12 of the second longitudinal portion 8 of the body of the dispenser 6.

Obviously, the gripping means may also be of another type and as an alternative, movement of the extension 11 can also be carried out by gripping it directly, or each handle can be made in a single piece with the extension 11.

The first portion 7 of the body of the dispenser 6 is made up of a first, external and axially hollow piece 21, and internally thereof at least a second, axially hollow piece 22 is applied, delimiting a channel for passage 23 of the water and/or steam in cooperation with a third, axially hollow piece 24 made of rubber and applied inside the second piece 22, and with a fourth, axially hollow piece 25 also applied in the second piece 22 in order to retain the third piece 24 inside the second piece 22.

The first piece 21 is, in turn, made in a single piece with the first tubular wall 12 of the second portion 8 of the body of the dispenser 6.

The third piece 24 has a protrusion 26 that is hermetically fitted, owing to an external perimeter gasket 27, in a lateral opening 28 in the second tubular wall 13 of the second portion 8 of the body of the dispenser 6 in a point distant from the end proximal to the resting surface 2 of the cups 3.

The lateral opening 28 is positioned in a section of the second tubular wall 13 comprised between a partition 29 occluding the internal cavity of the second tubular wall 13 and the end of the second tubular wall 13 adjacent to the resting surface 2 of the cups 3.

The protrusion 26 represents the support element for the second tubular wall 13 of the second portion 8 of the body of the dispenser 6.

Preferably at the end of the second tubular wall 13 of the second portion 8 of the body of the dispenser 6, distal from the resting surface 2 of the cups 3, a cap 30 is applied to completely cover also the corresponding end of the first tubular wall 12 of the second portion 8 of the body of the dispenser 6.

This construction permits extremely simple assembly of the dispenser 6: in practice, the second tubular wall 13 is introduced into the extension 11 and the resulting unit into the first tubular wall 12, thereby engaging the bridge 18 in the grooves 19; the protrusion 26 is then fit in the opening 28 so as to axially lock the second tubular wall 13 of the second portion 8 of the body of the dispenser 6; and lastly, the cap 30 is applied.

In the part external to the second piece 22, the fourth piece 25 has a sensing pin 32 for activating a micro-switch (not shown) positioned in the recess 20 of the front wall 1 of the machine where the terminal piece 5 is present. This micro-switch can be activated to signal the presence of the dispenser 6 connected to the terminal piece 5.

To strengthen the hydraulic and mechanical connection of the dispenser 6 to the terminal piece 5, a locking system can be provided, comprising, for example in the first portion 7, a compartment 33 accessible to a spherical element (not shown) that is partially extractable from a wall of the recess 20 facing the compartment 33 and movable in contrast to and by action of a spring (not shown).

The dispenser provides the advantage of varying the dispensing height based on the height of the cup, keeping unchanged and fixed the zone for connection to the terminal piece 5, which is, in turn, fixed as well.

The extension 11 is subjectable to stepless adjustment owing to the friction that the gasket 16 opposes to the sliding motion thereof and which enables it to maintain any intermediate position between the position of maximum extraction and the position of maximum retraction.

As no movable flexible tubes are provided in the machine body or in the body of the dispenser, the risk of damage is very limited.

The limited dimensions of the dispenser are such that a compartment 34 can be provided for the positioning thereof in an external wall of the machine when it is not being utilised.

The automatic coffee machine with a water and/or steam dispenser, thus conceived, is susceptible to numerous modifications and variants, all of which falling within the scope of the inventive concept; moreover, all details may be replaced with other, technically equivalent elements.

All the materials used, as well as the dimensions, may in practice be of any type, according to the requirements and the state of the art.

The invention claimed is:

1. An automatic coffee machine comprising:
a hydraulic circuit having a fixed terminal piece for supplying water or steam, accessible from a front wall of the machine at a distance above a resting surface of the machine; and
a dispenser that extends frontally of the front wall, wherein the dispenser comprises a hollow body having a first longitudinal portion and a second longitudinal portion that is rigidly connected to the first longitudinal portion and developing along a second longitudinal axis transverse to a first longitudinal axis of the first longitudinal portion, the first longitudinal portion having a first longitudinal end conformed for a rigid, removable hydraulic and mechanical connection with the fixed terminal piece and a second longitudinal end distal from the front wall wherefrom the second longitudinal portion extends, the second longitudinal portion slidingly supporting along the second longitudinal axis thereof by an extension for regulating a dispensing distance from the resting surface;
wherein the first longitudinal portion is made up of a first external and axially hollow piece, and internally thereof at least a second axially hollow piece is applied, delimiting a channel for passage of the water or steam, in cooperation with a third axially hollow piece made of rubber and applied inside the second axially hollow piece, and with a fourth axially hollow piece also applied in the second axially hollow piece to retain the third axially hollow piece inside the second axially hollow piece.

2. The coffee machine of claim 1, wherein the extension is supplied with a manual grip for activation thereof.

3. The coffee machine of claim 1, wherein the second longitudinal portion comprises a first tubular wall, and internally thereof a second tubular wall is positioned and hydraulically connected to the first longitudinal portion.

4. The coffee machine of claim 3, wherein the extension has a tubular configuration and is slidable in a gap defined between the first and the second tubular walls.

5. The coffee machine of claim 4, wherein the extension is extractable from a longitudinal end of the second longitudinal portion.

6. The coffee machine of claim 3, wherein the second tubular wall of the second longitudinal portion has an external perimeter gasket for hydraulic sealing with the extension.

7. The coffee machine of claim 3, wherein the first and the second tubular walls and the extension are coaxial.

8. The coffee machine of claim 1, wherein the fixed terminal piece and the first longitudinal portion of the hollow body are coupled along an axis thereof oriented perpendicularly to the front wall.

9. The coffee machine of claim 1, wherein the first longitudinal portion and the second longitudinal portion develop along axes that are perpendicular to each other.

10. The coffee machine of claim 3, further comprising a manual grip for activation of the coffee machine, wherein the manual grip comprises at least a handle positioned externally of the first tubular wall and connected to the extension by a bridge positioned through a longitudinal groove in the first tubular wall.

11. The coffee machine of claim 1, wherein the first longitudinal end of the first longitudinal portion of the hollow body has a shape interlockingly joined to a recess in the front wall where the fixed terminal piece is positioned.

12. The coffee machine of claim 1, wherein the first external and axially hollow piece is, in turn, made in a single piece with a first wall of the second longitudinal portion of the hollow body.

13. The coffee machine of claim 1, wherein the fourth axially hollow piece has a sensing pin for activating a micro-switch positioned in a recessed seat of the front wall of the coffee machine where the fixed terminal piece is located.

14. The coffee machine of claim 1, wherein the first longitudinal portion comprises a compartment accessible to a spherical element that is movable in contrast to and by action of a spring for locking the mechanical and hydraulic connection of the dispenser to the fixed terminal piece.

* * * * *